(12) United States Patent
Yang

(10) Patent No.: US 8,055,130 B2
(45) Date of Patent: Nov. 8, 2011

(54) OPTICAL TRANSCEIVER AMPLIFIER

(75) Inventor: Dan Yang, Ottawa (CA)

(73) Assignee: Dowslake Microsystems Corp., North Andover, MA (US)

( * ) Notice: Subject to any disclaimer, the term of this patent is extended or adjusted under 35 U.S.C. 154(b) by 868 days.

(21) Appl. No.: 12/003,950

(22) Filed: Jan. 3, 2008

(65) Prior Publication Data

US 2009/0175626 A1 Jul. 9, 2009

(51) Int. Cl.
*H04B 10/08* (2006.01)
*H04B 10/00* (2006.01)
(52) U.S. Cl. .......................................... 398/37; 398/160
(58) Field of Classification Search .................... 398/37, 398/34, 82, 160
See application file for complete search history.

(56) References Cited

U.S. PATENT DOCUMENTS

| 5,778,132 | A * | 7/1998 | Csipkes et al. ................. 385/135 |
| 6,236,499 | B1 * | 5/2001 | Berg et al. ................... 359/341.2 |
| 6,616,351 | B1 * | 9/2003 | Jang ................................ 398/94 |
| 2002/0051267 | A1 * | 5/2002 | Nakamura et al. ............. 359/134 |

* cited by examiner

*Primary Examiner* — Dalzid Singh
(74) *Attorney, Agent, or Firm* — Brion Raffoul

(57) ABSTRACT

Systems and devices for use as optical transceivers and amplifiers in optical networks. An optical transceiver/amplifier has two optical signal circulators, each of which receives one incoming signal and transmits one outgoing optical signal. Each circulator combines its incoming and outgoing signals on to a bidirectional optical connection internal to the transceiver amplifier. Between the two circulators are a pump laser, an optical coupler to couple the pump laser's power into the bidirectional connection, and an amplifying medium for amplifying the bidirectional signals internal to the transceiver amplifier. The amplifying medium may be an Erbium doped fiber which would amplify any optical signal passing through it. In one embodiment, the transceiver amplifier is in a self-contained package that is pluggable into existing equipment using pre-existing ports and interfaces.

11 Claims, 5 Drawing Sheets

OPTICAL TRANSCEIVER AMPLIFIER

FIELD OF THE INVENTION

The present invention relates to optical devices for use in optical communications networks. More specifically, the present invention relates to an optical amplifier to be used next to a receiver/transmitter. In other words, the present invention relates to an optical transceiver amplifier which, in one embodiment is also pluggable into existing optical networking devices.

BACKGROUND TO THE INVENTION

The field of telecommunications experienced an explosive growth in the last decade of the 20th century. Optical networking came to the forefront as being the technology of choice for some long-haul communications applications.

One of the advancements in optical networking during that time was the continuing development of the optical amplifier. Currently, optical amplifiers are widely used in today's fiber optic networks to amplify weakened signals. The invention of the optical amplifier made wavelength division multiplexing (WDM) possible. With optical amplifiers, repeaters can simultaneously amplify transmission signals transmitted through multiple optical wavelengths without the need to demultiplex the signals, convert each signal into an electrical signal, regenerate and then remultiplex the signals.

However, with the advancement in technology and materials, the cost of amplifiers has dropped dramatically, almost 10 times in the past 8 years. This steep decline in price renders single wavelength amplification a viable solution in certain applications such as those which involve extremely high data rates. These high data rates may lead to transmitters outputting weaker signals compared to lower data rates.

In these and other transmission systems, optical amplifiers have always been a fixed component. If the amplifier becomes defective, the whole circuit card containing the amplifier needs to be replaced.

Optical amplifiers also have a slight drawback in that they are uni-directional by nature. In most amplifiers, there is an input and an output. However, in the real world, signals propagate in a minimum of one fiber pair—one fiber for east to west, and another fiber for west to east.

Optical amplifiers also have another drawback—they have a weakness which causes optical transients when its input undergoes a sudden change. In a previous invention, there was disclosed a method to counter such optical transients (most often caused by fiber a cut). The large transient is especially damaging to optical receivers due to the limited range accepted by the receiver. For example, a 10 Gigabit receiver has an upper receiving power limit of −8 dBm. However, when there is an optical transient, the peak power may reach well beyond 0 dBm momentarily, causing the receiver not only to become saturated, but also causing the destruction of the receiver's internal semiconductor structure by the large pulse.

There is therefore a need for devices and systems which mitigate if not overcome the shortcomings of the prior art.

SUMMARY OF THE INVENTION

The present invention provides systems and devices for use as pluggable optical transceiver amplifiers in optical networks. A pluggable optical transceiver amplifier combines both a booster amplifier and a receiver amplifier (often also called pre-amplifier) into one, to be placed next to the transmitter/receiver (transceiver), and is pluggable in order to decrease initial equipment cost.

A pluggable optical transceiver amplifier has a mechanical design using standard parts allowing it to be hot-pluggable, has two optical signal circulators, each of which receives one incoming signal and transmits one outgoing optical signal such that it amplifies both transmitting and receiving signals. Each circulator combines its incoming and outgoing signals on to a bidirectional optical connection internal to the transceiver amplifier. Between the two circulators are a pump laser, an optical coupler to couple the pump laser's power into the bidirectional connection, and an amplifying medium for amplifying the bidirectional signals internal to the transceiver amplifier. The amplifying medium may be an Erbium doped fiber which would amplify any optical signal passing through it. In one embodiment, the transceiver amplifier is in a self-contained package that is pluggable into existing equipment using pre-existing ports and interfaces.

In accordance with a first aspect of the present invention there is provided an optical transceiver amplifier for receiving, transmitting, and amplifying optical signals in both transmitting and receiving paths combining both booster amplifier and pre-amplifier into one, the transceiver amplifier comprising:

a first optical signal circulator having a first bidirectional optical connection for carrying two optical signals being propagated in opposite directions, said first circulator being for receiving a first internal input signal to be transmitted through said first bidirectional connection, said first circulator also being for transmitting a first internal output signal received from said first bidirectional optical connection a pump laser for providing power to at least one optical signal a WDM coupler for coupling said pump laser to said first bidirectional optical coupler such that optical power from said pump laser boosts a power of any optical signals in said first bidirectional optical connection a second optical signal circulator having a second bidirectional optical connection for carrying two optical signals being propagated in opposite directions, said second circulator being for receiving a second internal input signal to be transmitted through said second bidirectional connection, said second circulator also being for transmitting a second internal output signal received from said second bidirectional optical connection an amplifying medium for amplifying optical signals, said amplifying medium being coupled between said WDM coupler and said second optical circulator, said amplifying medium coupled to said second circulator by way of said second bidirectional connection.

In accordance with a second aspect of the present invention, there is provided an optical transceiver amplifier that is hot-pluggable in the field. It comprises a mechanical setup in the similar way as standard pluggable optical transceivers such as XFP. It makes the transceiver amplifier an easy option to add on during service such that the operator does not need to pay for the amplifier at the beginning if it is not needed, often because of lower capacity requirements at the beginning of the equipment life. The operator can then plug in a pluggable transceiver amplifier when higher capacity requirements make it necessary to use additional amplification.

In accordance with another aspect of the invention, the pluggable transceiver amplifier utilizes the nature of the amplification medium and the regular transmission system setup. A pre-amplifier typically suffers transient overshoot/undershoot and this causes damage to the receiver due to a fiber cut. The transmitting path often has a very high input signal level making the amplification medium, such as Er doped fiber, saturated while the receiving path has most of time, a low level input signal and, as such, the amplification of such signal on the receiving path requires minimum amplification effort. As consequence, combining the 2 paths into one not only makes it economical while keeping a small footprint to allow a pluggable design, but also the nature of the transmitting and receiving path signal characteristics are combined to waste no resources in suppressing a transient effect.

BRIEF DESCRIPTION OF THE DRAWINGS

A better understanding of the invention will be obtained by considering the detailed description below, with reference to the following drawings in which.

DETAILED DESCRIPTION

Figure 1:
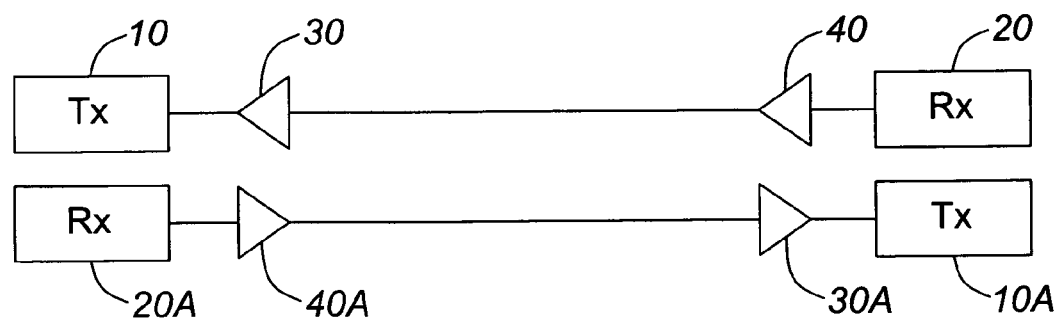
FIG. 1 illustrates two branches of an optical communications system according to the prior art.

As noted above, known optical amplifiers suffer from a number of drawbacks. A standard optical amplifier application is as illustrated in FIG. 1. The system in FIG. 1 illustrates a typical two-way optical communication system. One branch has a transmit end 10 and a receive end 20. The other branch also has a transmit end 10A and a receive end 20A. As is commonly known, a booster optical amplifier 30, 30A is usually placed right after the transmitter 10, 10A where the input optical power is generally high. For this application, the optical amplifier requires high pump power as it usually needs to boost the final output power up, often to a gain of about 10 to 15 dB. On the receive side, a pre-amp Optical amplifier 40, 40A is usually placed just prior to the receive end 20, 20A. Because of the weak signal input, minimal pump power is needed for significant gain in signal strength. However, because of the weak input, the majority of any pump power used at this receive end of the transmission is wasted as it merely generates optical noise, which, in turn, degrades the signal to noise ratio. Thus, for real applications, the gain for a pre-amplifier optical amplifier is often limited to avoid generating optical noise (called ASE—amplified spontaneous emission, a character of Erbium doped fiber).

Because of these factors, the utilization of optical amplifiers in the above configuration is not optimum due to the waste of significant amounts of pump power at the pre-amplifier configuration. In addition, because of the nature of Erbium's physics, a sudden drop in the input signal (due to a fiber cut for example) causes a large pulse in the output power. This is due to the sudden population change in the upper energy level of Er ions. Receivers (such as receivers 20, 20A in FIG. 1) are often damaged due to such large pulse. As illustrated by the scope picture of FIG. 2, when input power drops (pink line), output power (yellow line) has a huge transient pulse.

Figure 3:
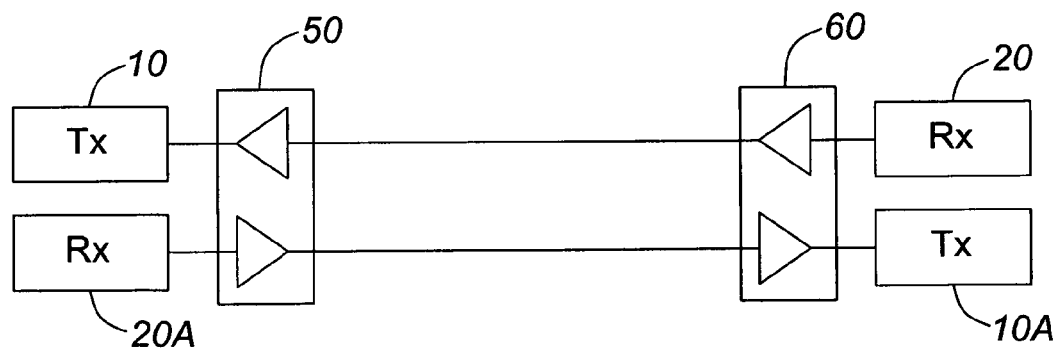
FIG. 3 illustrates an optical communications system using one embodiment of the present invention.
Figure 2:
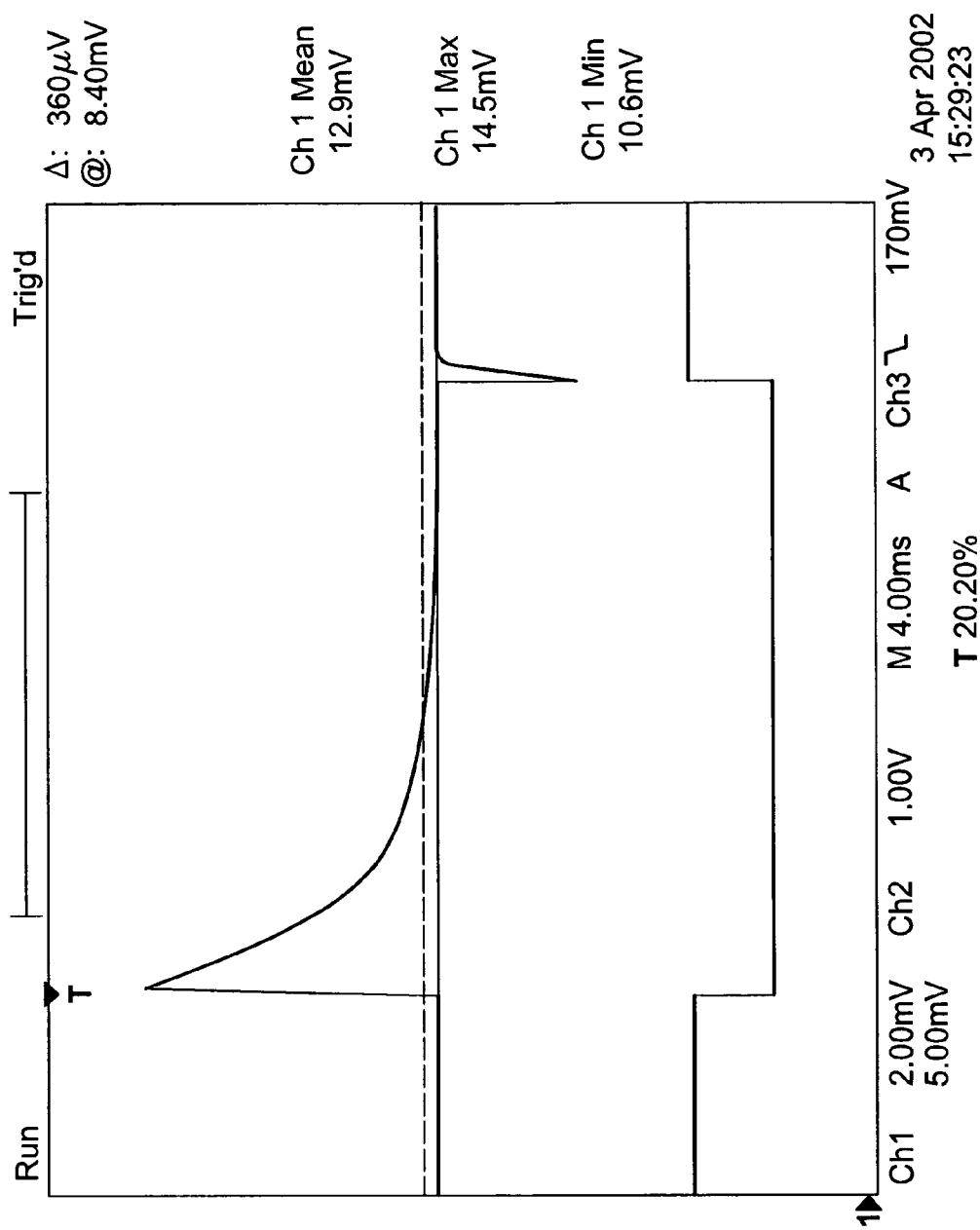
FIG. 2 is an illustration of an oscilloscope picture showing a large transient pulse.

One solution to the above issue is that of using a single optical amplifier for both the booster and the pre-amp applications. Because pre-amp does not need much pump power, the pre-amp and the booster can be co-located and can share the same set of amplifier components. Referring to FIG. 2, the system in FIG. 1 can be redrawn with similar components having the same reference numbers. The main difference between FIG. 1 and FIG. 3 is that in, in FIG. 3, a single component transceiver amplifier 50, 60 is used just prior to each transmitter 10, 10A and each receiver 20, 20A. Each transceiver amplifier 50, 60 receives and transmits two signals—one from each branch of the system. Thus, from the transmit end 10, transceiver amplifier 50 (in the booster amplifier role) receives a signal and amplifies it for transmission to the transceiver 60. Transceiver 60, in turn, amplifies this received signal (in the pre-amp role) and transmits it to the receive end 20. Similarly, transceiver 60 (in the booster role) receives a signal from transmit end 10A and amplifies this signal for transmission to the transceiver amplifier 50. The transceiver 50 (in its pre-amp role) amplifies this signal and transmits it to the receive end 20A.

Each transceiver amplifier 50, 60 in FIG. 3 accomplishes its function by having a single amplifying medium or amplifying subsystem to amplify signals being propagated in opposing directions. One configuration for such a transceiver amplifier is illustrated in FIG. 4.

Figure 4:
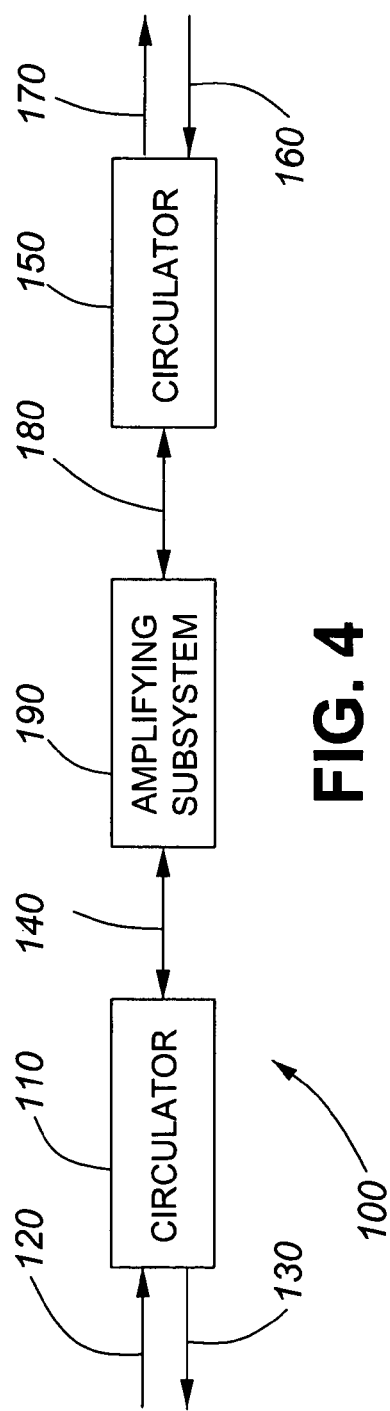
FIG. 4 illustrates a detailed block diagram of one embodiment of the invention.

Referring to FIG. 4, a transceiver amplifier 100 is illustrated. A first optical circulator 110 receives a first internal input signal 120 and transmits a first internal output signal 130. The first optical circulator 110 also has a first bidirectional connection 140 which carries a bidirectional signal composed of signals that will be output by the circulator 110 as the first output signal 130 and signals that was received by the circulator 110 as the first internal input signal 120. Similar to the first optical circulator 110 is the second optical circulator 150. This optical circulator 150 receives a second internal input signal 160 and transmits a second internal output signal 170. A second bidirectional confection 180 is coupled to the second circulator 150. The second bidirectional connection 180 also carries bidirectional signals that are versions of the second internal output signal 170 and of the second internal input signal 160.

Between the first and second bidirectional connections 140 and 180 is coupled an amplifying subsystem 190. The amplifying subsystem 190 amplifies, the optical signals that passes through it, regardless of whether the signal is propagating from the first circulator 110 to the second circulator 150 or from the second circulator 150 to the first circulator 110.

Figure 5:
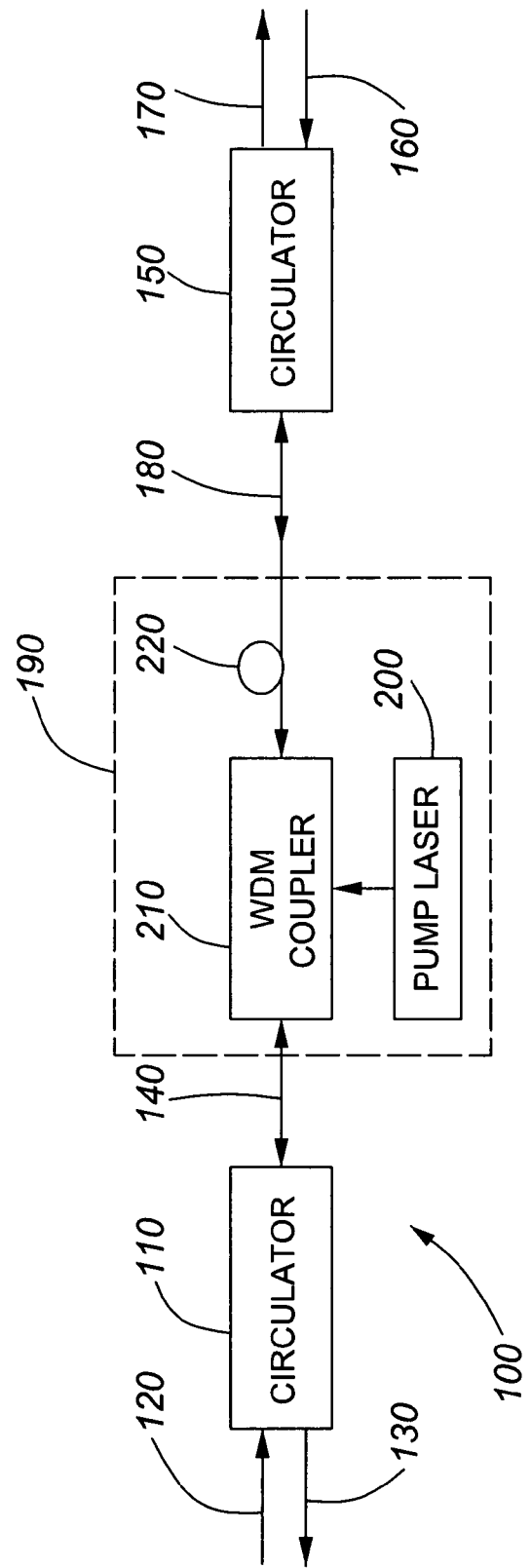
FIG. 5 illustrates a more detailed block diagram of another embodiment of the invention.

One possible configuration for the amplifying subsystem 190 is that illustrated in FIG. 5. As can be seen from FIG. 5, the amplifying subsystem 190 has a pump laser 200, a WDM coupler 210, and an amplifying medium 220. The pump laser 200 provides pump power to the signals being propagated in either direction and the pump laser 200 is coupled to the coupler 210 for this. The first bidirectional connection 140 is coupled to the coupler 210 which, in turn, is coupled to the amplifying medium 220. The amplifying medium is coupled to the second bidirectional connection 180. In one embodiment, the amplifying medium is an Erbium doped fiber.

It should be noted that optical circulators, such as optical circulators 110, 150, are well-known in the art as devices which allow the combining into one optical fiber of two optical signals being propagated in different or opposing directions.

The configuration in FIG. 5 has a number of advantages. Because of the dominance of the input signal from the transmission side (where the transceiver amplifier is being used as a booster amplifier), the overall amplifier gain is dominated by the booster while pre-amp signal still shares the same amplification medium, i.e. the pump laser and the amplifying Erbium Doped Fiber. With this configuration, the pre-amplifier gain is the same as booster gain, making the gain uniform for both fibers of the fiber pair (see FIG. 4).

This advantage explained above arises by positioning the transceiver amplifier proximate or close to the transmitting end of a first receiver/transmitter pair and proximate or close to the receiving end of a second receiver/transmitter pair. By doing this, since the transmitter of the first receiver/transmitter pair outputs a strong signal (usually in the order of 0 dBm) and since the receiver of the first receiver/transmitter pair receives a relatively weak signal (usually in the order of 25 to 35 dB below the transmitter signal strength), the strong transmitter signal will lock the gain and the receiver signal can be amplified with little pump power. The transmitter signal will consume most of the pump power from the pump laser while the receiver signal will still be amplified.

Another advantage to the configuration is that the large transient pulse is avoided. Since the transceiver amplifier pump power is used mostly by the signal that uses that the transceiver amplifier as a booster, overall amplifier gain is still locked by this strong signal input. If the signal propagating in the other direction (the signal which uses the transceiver amplifier as a pre-amp) disappears, there is no large transient pulse for the power is still being used by the signal which uses the transceiver amplifier as a booster. In this way, the large transient pulse, and the attendant possible damage to the receiver circuitry, is avoided.

This use of a single transceiver amplifier to amplify two signals (one going one direction and another propagating in the other direction) also allows for tighter physical packaging and makes possible a pluggable optical transceiver amplifier. Such a pluggable transceiver amplifier (pluggable into existing optical networking devices) would be constructed to have similar physical and mechanical limits and specifications as that used by well-known SFP (small form factor pluggable) and XFP optical transceivers.

As an example of a pluggable transceiver amplifier, such a device would have a similar but larger cage as XFP and SFP transceivers. Similarly, the pluggable transceiver amplifier would also use the same connectors as XFP and SFP transceivers. A diagram of such a transceiver amplifier is illustrated in FIGS. 6a, 6b, 6c.

Figure 6C:
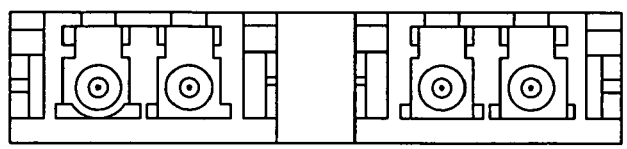
FIGS. 6a, 6b, 6c illustrate a pluggable transceiver amplifier according to one aspect of the invention.
Figure 6A:
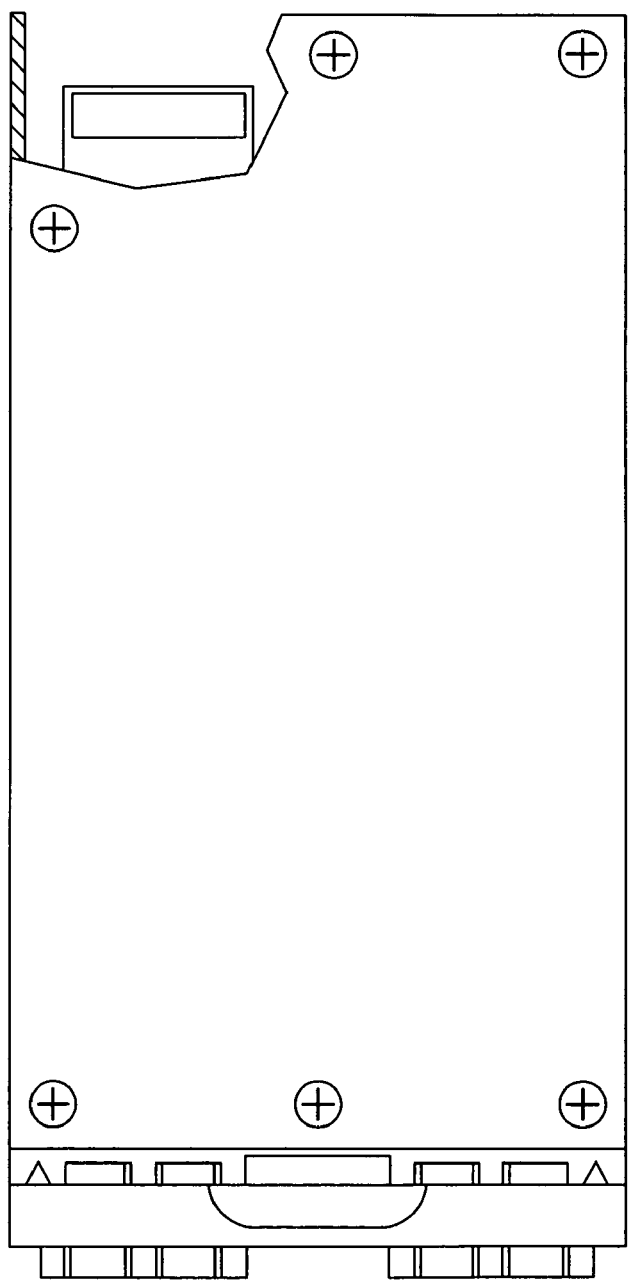
Figure 6B:
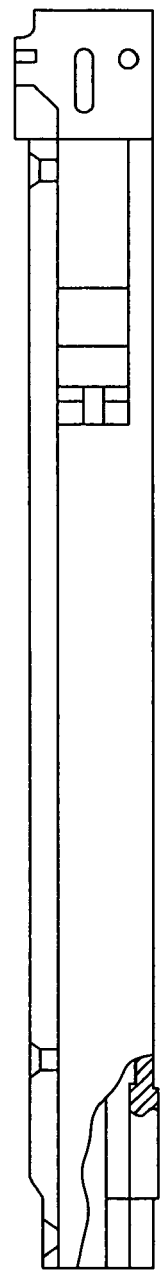

Referring to FIGS. 6a, 6b, 6c, three views of such a pluggable module is illustrated. FIG. 6a is a top down view of the transceiver amplifier. FIG. 6b illustrates a side view of the transceiver amplifier while FIG. 6c illustrates an end view of the transceiver amplifier showing two input and two output plugs of the device. The upper right corner of FIG. 6a illustrates a connector which would mate with existing equipment to make the device removably pluggable into existing equipment.

It should be noted that such a pluggable transceiver amplifier provides advantages that other transceivers or amplifiers do not. Specifically, such devices would utilize existing transceiver fixtures and electrical interfaces, thereby minimizing the cost from both the design, and user/application points of view while at the same time providing for an amplifier for any future needs. As an example, if a network initially has 1 or 2 channels, the transceivers will have enough of a loss budget. However, if, at a later date, an upgrade is desired to add more channels, they may need to add an amplifier due to signal strength losses attributable to other factors such as a multiplexer. In this example, the presence of the amplifier would allow for a quicker and easier upgrade.

Another advantage to such pluggable transceiver amplifiers is due to the increasing popularity of 10 G Ethernet and 40 G high data rates. For a 10 G switch, router, or any other 10 G optical device, providing a relatively cheaper plug for a pluggable optical amplifier would allow switches, routers, and high data rate servers to instantly reach much longer distances or to overcome lossy transmission links whenever such a capability is needed.

It should further be noted that while the above description describes a bidirectional transceiver amplifier, a pluggable unidirectional optical amplifier is also possible. Such a pluggable unidirectional optical amplifier may have an internal structure illustrated in FIG. 7.

Figure 7:
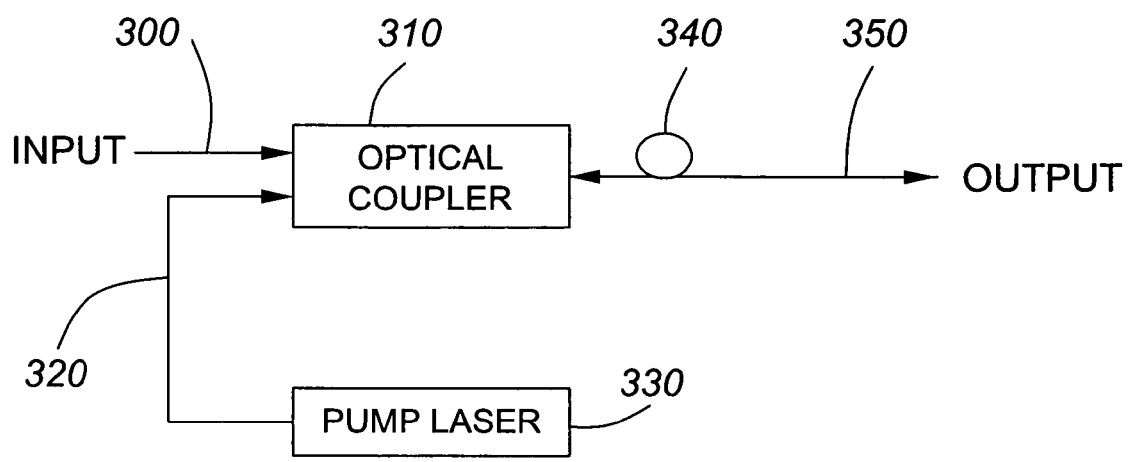
FIG. 7 is a block diagram of an internal structure of a pluggable unidirectional optical amplifier.

Referring to FIG. 7, an optical input 300 is received by an optical coupler 310. The optical coupler 300 also receives the output 320 of a pump laser 330. The output of the optical coupler 300 is then received by an amplifying medium 340. The output of this amplifying medium 340 is the output 350 of the unidirectional optical amplifier.

The pluggable unidirectional optical amplifier may be placed adjacent either the transmitter or the receiver in a transmitter/receiver pair. If it is placed adjacent to the transmitter, it would boost signal received from the transmitter prior to being transmitted to the receiver. If it is placed adjacent the receiver, it would amplify the weak signal received from the transmitter. The amplified signal would then be received by the receiver of the transmitter/receiver pair.

The pluggable unidirectional optical amplifier would have similar mechanical and physical characteristics as the transceiver amplifier. The pluggable optical amplifier may have a similar but larger cage as XFP and SFP transceivers. The device would also use the same connectors as XFP and SFP transceivers. The pluggable unidirectional optical amplifier may have a configuration similar to that illustrated in FIGS. 6a-6c. A cage would surround the optical amplifier and the cage would have suitable ports or plugs which would allow input and output signals to couple to the device. A suitable connector (as shown in the upper right hand corner of FIG. 6a) to existing equipment would allow the module to be removably pluggable, possibly hot-pluggable, into existing equipment.

It will be apparent to those skilled in this art that various modifications and variations may be made to the embodiments disclosed herein, consistent with the present invention, without departing from the spirit and scope of the present invention.

Other embodiments consistent with the present invention will become apparent from consideration of the specification and the practice of the invention disclosed therein. Accordingly, the specification and the embodiments are to be considered exemplary only, with a true scope and spirit of the invention being disclosed by the following claims.

I claim:

1. An optical transceiver amplifier for receiving, transmitting, and amplifying optical signals in both transmitting and receiving optical paths, the transceiver amplifier comprising:
   a first optical signal circulator having a first bidirectional optical connection for carrying two optical signals being propagated in opposite directions, said first circulator being for receiving a first internal input signal to be transmitted through said first bidirectional connection, said first circulator also being for transmitting a first internal output signal received from said first bidirectional optical connection
   a single pump laser for providing power to two optical signals being propagated in opposite directions a WDM coupler for coupling said pump laser to said first bidirectional optical coupler such that optical power from said pump laser boosts a power of any optical signals in said first bidirectional optical connection a second optical signal circulator having a second bidirectional optical connection for carrying two optical signals being propagated in opposite directions, said second circulator being for receiving a second internal input signal to be transmitted through said second bidirectional connection, said second circulator also being for transmitting a second internal output signal received from said second bidirectional optical connection a single amplifying medium for amplifying optical signals, said amplifying medium being coupled between said WDM coupler and said second optical circulator, said amplifying medium coupled to said second circulator by way of said second bidirectional connection;

whereby both a booster amplifier and pre-amplifier are combined in said transceiver amplifier and wherein said transceiver amplifier is removably pluggable into existing optical networking equipment.

2. An optical transceiver amplifier according to claim 1 wherein said amplifying medium is an Erbium doped optical fiber.

3. An optical transceiver amplifier according to claim 1 wherein said transceiver amplifier is self-contained in a pluggable module.

4. An optical transceiver amplifier according to claim 3 wherein said pluggable module is pluggable into existing optical equipment.

5. An optical transceiver comprising:
a first optical circulator receiving a first input signal and transmitting a first output signal
a second optical circulator receiving a second input signal and transmitting a second output signal
an amplifier subsystem for amplifying at least two optical signals, said subsystem being coupled between said first circulator and said second circulator
wherein
said first output signal is an amplified version of said second input signal
said second output signal is an amplified version of said first input signal
said first input signal and said second input signal are being propagated in opposite directions;
said amplifier subsystem comprises:
a single pump laser
a WDM coupler for coupling an output of said pump laser into a first bidirectional connection coupled to said first circulator
a single amplifying medium coupled between said coupler and said second circulator, whereby said transceiver acts as a booster amplifier for said first input signal and as a pre-amplifier for said second input signal.

6. An optical transceiver according to claim 5 wherein said amplifying medium is an Erbium doped optical fiber.

7. An optical transceiver according to claim 5 wherein said transceiver is self-contained in a removably pluggable self-contained module.

8. An optical transceiver according to claim 7 wherein said transceiver is removably pluggable into existing optical equipment.

9. A method for boosting a transmitted optical signal, the method comprising:
a) combining a transmitted optical signal and a received optical signal in a single bidirectional optical fiber to result in a bidirectional optical signal, said transmitted optical signal being propagated in a direction opposite said received optical signal;
b) boosting said bidirectional optical signal by providing a single pump laser adjacent a transmitter from which said transmitted optical signal is transmitted;
c) amplifying said bidirectional optical signal by providing a single amplifying medium adjacent a point on said bidirectional optical fiber where said pump laser is coupled into said bidirectional optical fiber.

10. A method according to claim 9 wherein step a) is accomplished by using an optical circulator.

11. A method according to claim 9 wherein step d) comprising splitting said bidirectional optical signal into said transmitted optical signal and said received optical signal.

* * * * *